Figure 1:
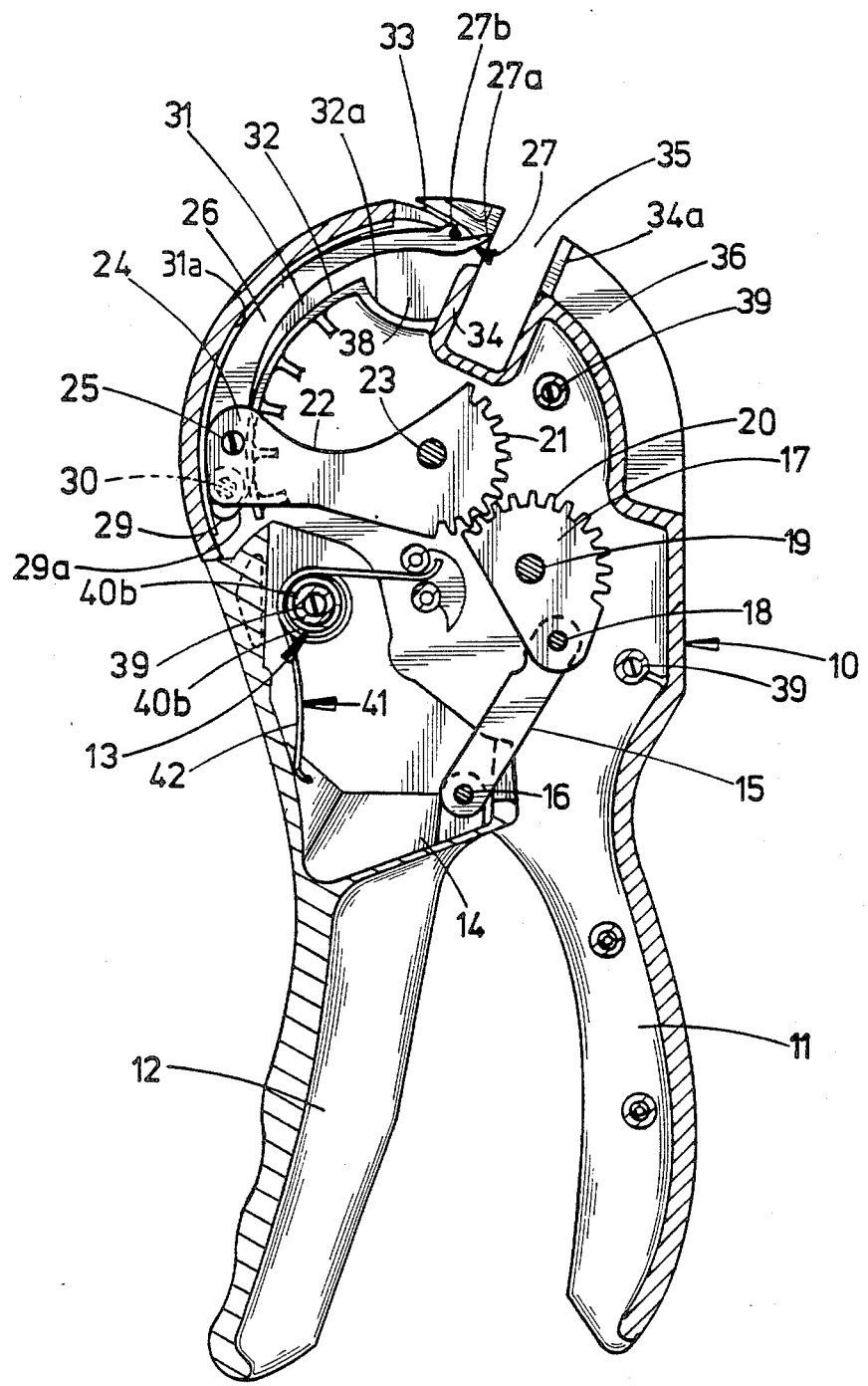

United States Patent [19]

Cohr et al.

[11] Patent Number: 4,738,258
[45] Date of Patent: Apr. 19, 1988

[54] APPLICATOR TOOL

[75] Inventors: Lindsay W. J. Cohr; Urs Schupbach, both of Palmerston North, New Zealand

[73] Assignee: Allflex International Limited, Palmerston North, New Zealand

[21] Appl. No.: 853,471

[22] Filed: Apr. 18, 1986

[30] Foreign Application Priority Data

Apr. 19, 1985 [NZ] New Zealand .................. 211853

[51] Int. Cl.$^4$ .............................................. A01K 11/00
[52] U.S. Cl. ..................................... 128/330; 227/144
[58] Field of Search .................. 128/330, 329 R, 316; 227/144

[56] References Cited

U.S. PATENT DOCUMENTS

| 4,281,657 | 8/1981 | Ritchey | 128/330 |
| 4,368,735 | 1/1983 | Filmer | 128/330 |
| 4,552,147 | 11/1985 | Gardner | 128/330 |

FOREIGN PATENT DOCUMENTS

| 242379 | 12/1962 | Australia | 128/330 |
| 633742 | 7/1936 | Fed. Rep. of Germany | 128/330 |
| 01177 | 4/1983 | World Int. Prop. O. | 128/330 |
| 161515 | 4/1921 | United Kingdom | 128/330 |
| 2114045 | 8/1983 | United Kingdom | 128/330 |

Primary Examiner—Michael H. Thaler
Attorney, Agent, or Firm—Blakely, Sokoloff, Taylor & Zafman

[57] ABSTRACT

An applicator tool comprising a body with a lever pivotally mounted with the body. An applicator needle is coupled via a coupling arrangement to the lever. The applicator needle is adapted at the free end thereof to engage with the leading portion of a tag. Overall the applicator needle is of curved shape and it is located by guide means such that as the lever is pivotally moved this movement is reflected in movement of the applicator needle on an arcuate path.

12 Claims, 5 Drawing Sheets

APPLICATOR TOOL

This invention relates to an applicator tool and more particularly but not exclusively to an applicator tool intended for installing a tag into an animal's ear. Whilst the following description will primarily relate to an applicator tool for animal ear tags it is also usable for installing tags into other objects whether they be animate or inanimate.

One piece tags of a flexible nature intended primarily for identification purposes are known. Usually such designs of tags are installed by the use of a hand held trocar which when used on the ear of an animal requires a degree of strength and/or technique by the user. Such applicator tools generally result in a large opening in the animal's ear and this often leads to difficult to heal wounds and/or tag retention problems. To overcome the difficulties associated with the strength and/or technique required by the user it is known to mount the blade portion of such trocar tools in a pliers type applicator but such applicators have generally not been successful because they are large and unwieldy and require a long lever stroke to achieve the correct length of stroke of the blade. Additionally such pliers type applicators are often difficult to load though this usually arises from the fact that the design of the tag is such that the head thereof must be loaded into the tool in a particular manner to ensure the head is in a compact form for passage through the animal's ear.

Accordingly, the present invention has an object to provide an applicator tool which is of a compact and readily usable size but still provides a long stroke of the applicator needle without extensive movement of the operating lever.

A further object is to provide an applicator tool in which the head of the tag is easily loaded into the tool and compaction of the head occurs as the tag is applied.

Broadly the invention consists of an applicator tool comprising a body, a lever pivotally mounted with the body, an applicator needle adapted at a free end thereof to engage with the leading portion of a tag and means coupling said needle to said lever such that pivotal movement of the lever is reflected in movement of the needle, said needle being of overall curved shape and being located by guide means whereby the needle moves, during application of a tag, on an arcuate path.

The applicator tool is particularly suited for the application of a tag of the type described in our New Zealand patent specification No. 207898 the contents of which are incorporated herein by specific reference. The tag in the aforesaid patent specification is broadly a one piece tag formed from resilient plastic material comprising a mounting member and a pair of panels attached thereto. The mounting member, which can be of curved cross-section has a pair of limb portions coupled together by an intermediate portion which preferably together form a V or U shape. A panel extends from the end of each limb portion and an opening is provided at the end of the free end of at least one panel. The or each panel is of generally this elongate shape the thickness of at least one panel being significantly less than the thickness of the mounting member.

The applicator tool of the invention can also be used for other one piece flexible tags having a panel, a neck extending therefrom and a head portion at the free end of the neck. Such a tag is described in our New Zealand patent specification No. 195287.

Figure 2:
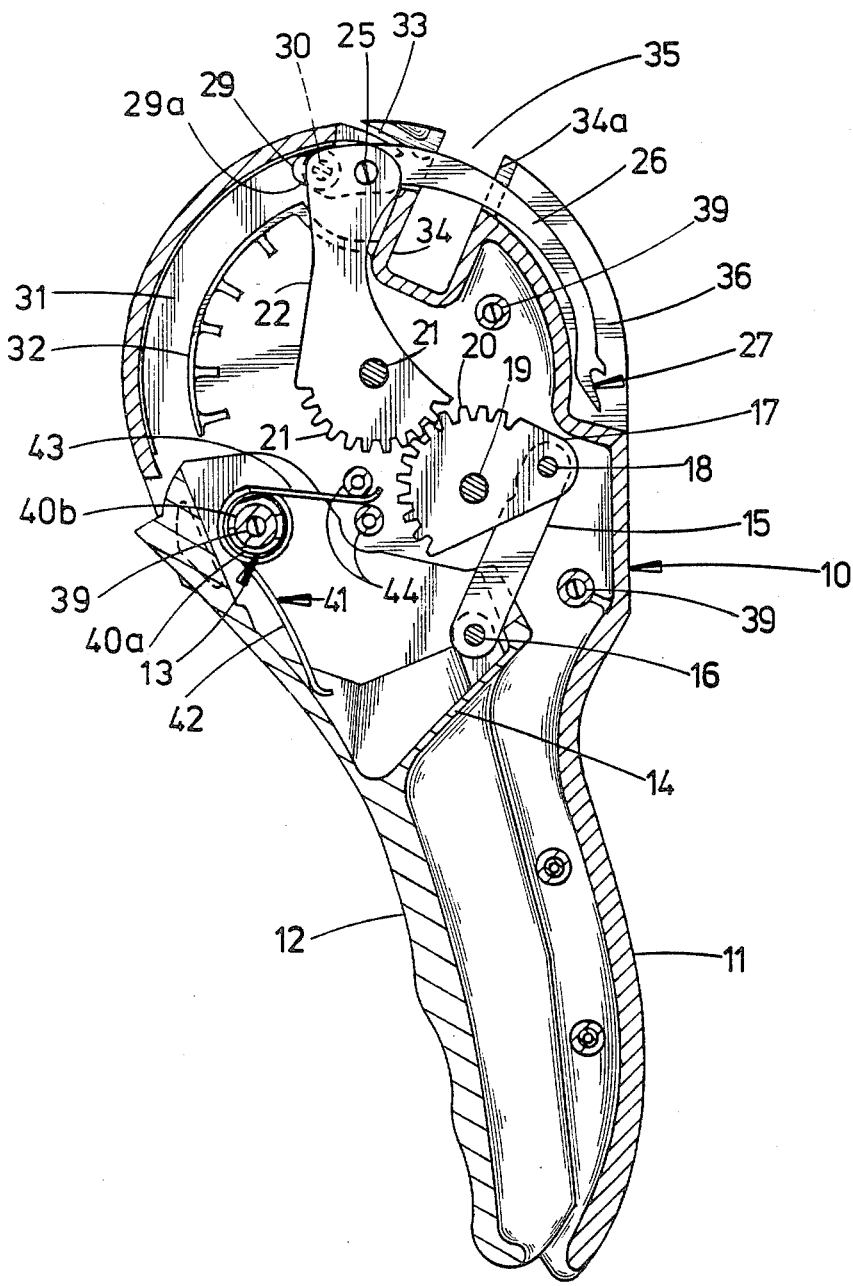
Figure 3:
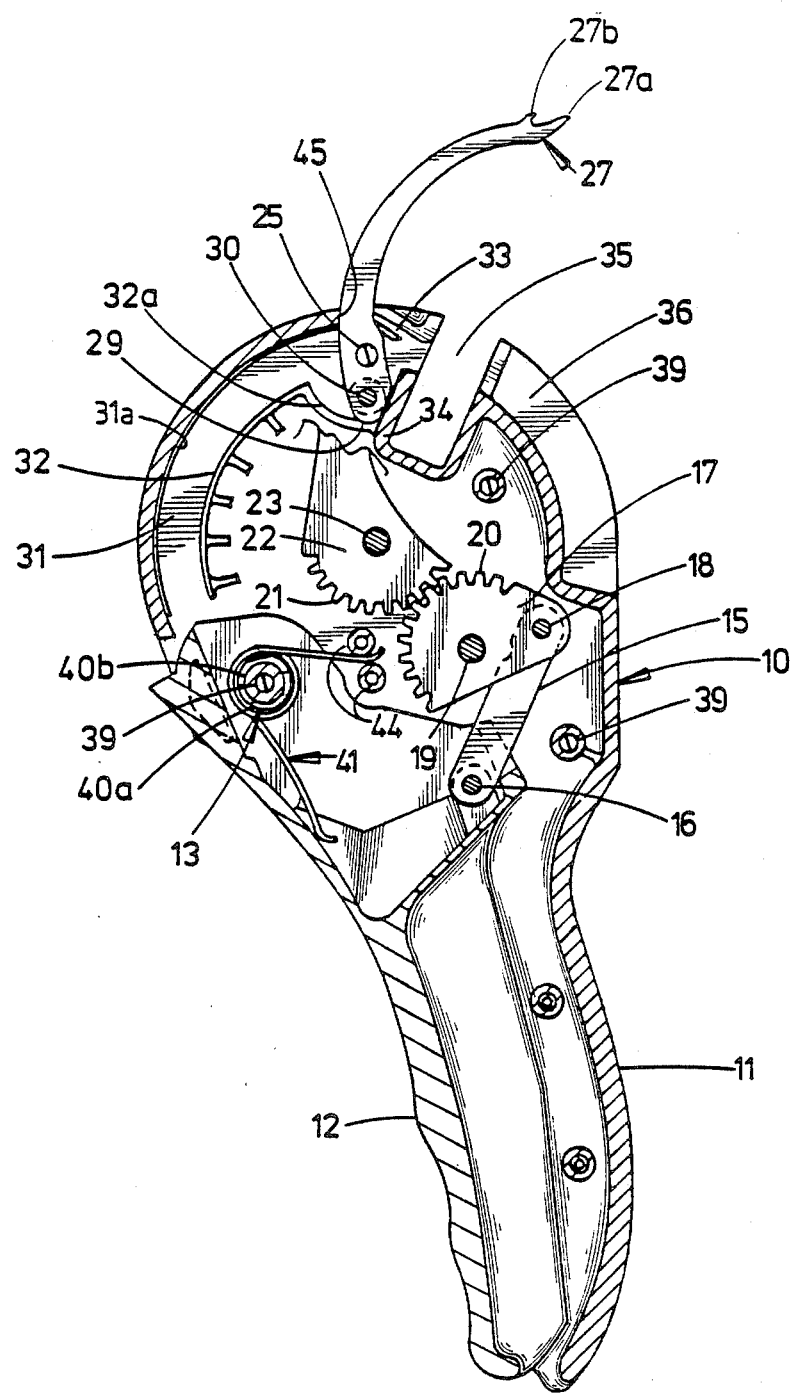
Figure 4:
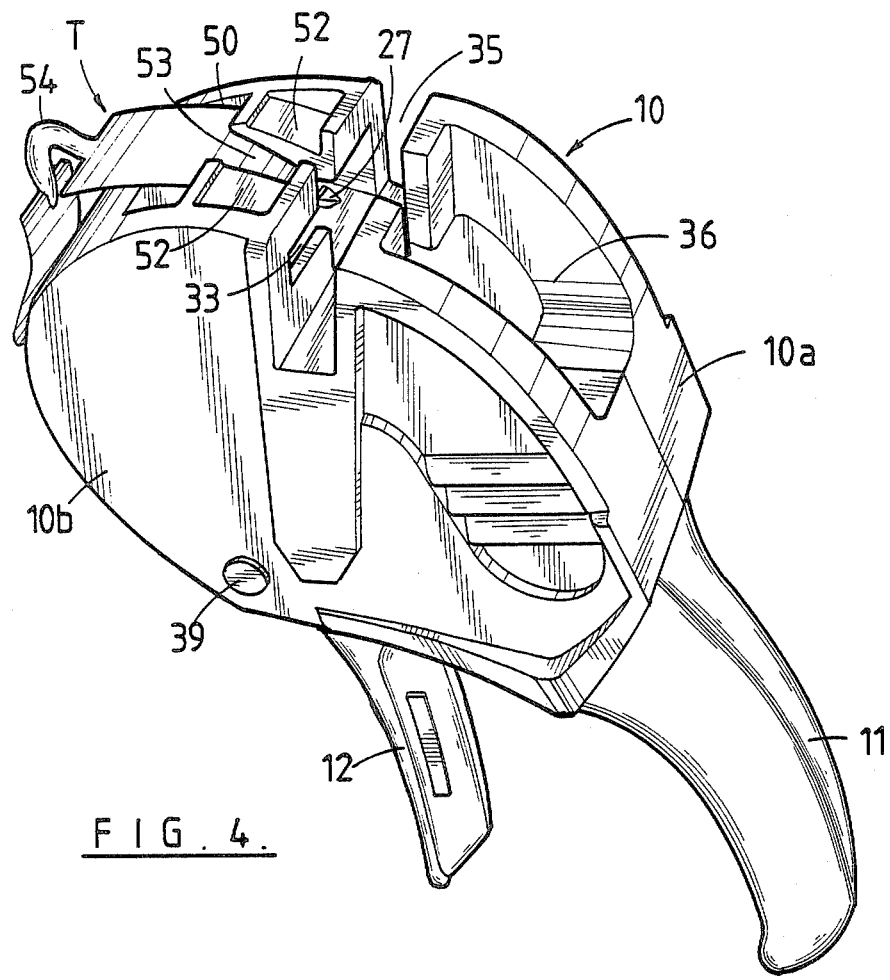
Figure 5:
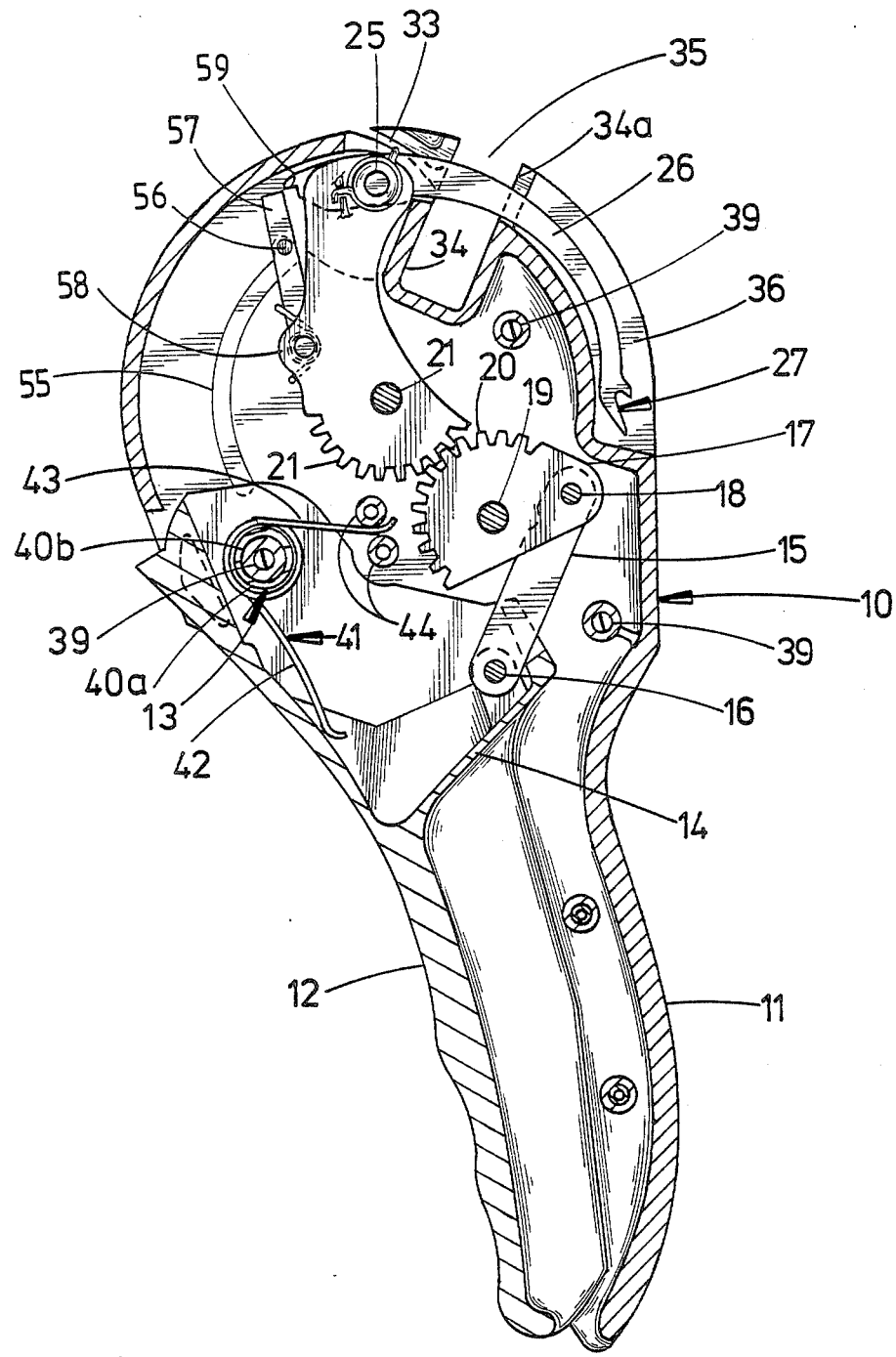

In the following more detailed description of the invention according to its preferred form reference will be made to the accompanying drawings in which:

FIG. 1 is a cross-sectional elevation of the applicator tool in the open position, FIG. 2 is a similar view but showing the applicator tool in a closed position, FIG. 3 is yet a further cross-sectional elevation of the applicator tool in the closed position but with the applicator needle shown in the "release" position, FIG. 4 is a perspective view of the applicator tool with a tag of the type disclosed in New Zealand Patent Specification No. 207898 installed, and FIG. 5 is a view similar to FIG. 3 but of a modified form of the applicator tool.

The applicator tool construction as illustrated, and as will hereinafter be described, is capable of being constructed primarily of suitable plastics material. Components requiring high strength and/or having a design or function not readily permitting them to be constructed from plastics can be of metallic construction. For example the body and lever can be moulded from a plastics material whilst the operating mechanism can be constructed from plastics or metal. Preferably the applicator needle is of metal construction.

Referring to the drawings the applicator has a body 10 integrally formed with a handle 11. The body 10 and handle 11 are formed in two pieces (see join line in FIG. 4) which are fastened together by mechanical fastenings 39 when the applicator is fully assembled. Pivotally mounted on the body 10 about pivot point 13 is a lever 12. Both the lever 12 and handle 11 are formed so that they can be readily and comfortably gripped in the hand of an operator.

Lever 12 has an inwardly projecting portion 14 to which a link 15 is pivotally mounted at one end about pivot 16. This link 15 is pivotally mounted by its other end about pivot 18 to a toothed quadrant 17 which is able to rotate about stub axle 19. The teeth 20 of quadrant 17 mesh with teeth 21 of a pivot arm 22 which pivots about pivot point 23.

Pivot arm 22 has a free end 24 to which an elongate longitudinally curved applicator needle 26 is pivotally coupled about a pivot pin 25. The free end 27 of needle 26 is pointed at 27a and has an upwardly and forwardly directed lug 27b. This lug, as will hereinafter be described, is engageable in an opening in a tag T (see FIG. 4). The pivoted end of needle 26 has a rearwardly extending portion 29 which includes a flat surface 29a merging into the upper surface of the needle via a rounded surface. A roller 30 is rotatably carried by the extension 29.

Needle 26, in the open position of the applicator (i.e. FIG. 1), lies substantially entirely within a curved guide passge 31. This passage 31 is defined by the inner wall surface of body 10 and an internal partition wall 32. The pivot arm 22 lies above the terminal edge of wall 32 and thereby can move needle 26 within passage 31.

The free end 27 of needle 26 lies (in the fully open position of the applicator) in the vicinity of a slot 33 which opens to the exterior of the applicator body 10. The leading end 50 of a tag T, such as described in New Zealand patent specification No. 207898, can be inserted through the slot 33 so that it forces over the lug 27b, the tag, due to it being held down by the pair of ramps 52 which form the upper part of slot 33, deforming over the lug until the opening 51 in the tag aligns with the lug 27b where upon the tag portion 50 resumes its normal shape such that the lug 27b engages in the opening 51. In this way the tag automatically becomes engaged on lug 27b as the needle moves forwardly thus obviating the need for the operator of the applicator to physically locate the tag opening 51 with the lug 27b.

For ease and clarity of description the following will relate to operation of the applicator tool assuming that a leading portion or head 50 of a tag T to be applied has been inserted through slot 33 and the lug 27b has engaged in the tag opening 51. It will be assumed that the tag is to be applied to the ear of an animal.

The ear of the animal is located within the confines of recess 35, this recess opening to the periphery of the body 10 and extending completely through the body. It will be appreciated that the recess is of restricted dimensions so that the ear is engaged or quickly becomes engaged during the early stages of application with a pair of spaced apart pressure surfaces 34a (see FIG. 4) so as to be supported thereby.

Movement of lever 12 toward handle 11 is transmitted via link 15, quadrant 17 and pivot arm 22 to th needle 26 such that the needle moves in an arcuate path along passage 31. The forward end 27a of the needle penetrates the ear drawing with it tag T. The needle continues to move through the ear until full application of the tag results (i.e. the applicator is in the fully closed position) with needle 26 lying substantially fully across recess 35 and within a groove 36 (see FIG. 2).

In this position the end of 24 of pivot arm 22 lies within an enlarged part of passage 31 formed by wall 32a falling away toward wall 34 of recess 35. This enlargement of the passage 31 permits extension 29 of needle 26 to pivotally move (about pivot 25) within the passage until the flat surface 29a thereof contacts wall 34 (see FIG. 3). Needle 26 can thus move from recess 35 and groove 36 to project from body 10 as shown in FIG. 3. It will be appreciated that the pair of spaced apart ramps 52 provide a cutaway portion or open ended slot 53 to permit this movement to take place and also to allow for movement of the neck or joining element 54 of the tag during application. Accordingly at the point of full application of the tag the needle is free to move to the position shown in FIG. 3 thus permitting the operator to draw the applicator tool down away from the ear and thereby release the needle from the installed tag.

Upon completion of installation of the tag the operator releases pressure on lever 12 such that under the bias of spring 41 the lever reassumes the fully open position. Spring 41 has a first leg 42, which engages on the inner wall of lever 12, a portion which curves about the sleeve 40 of pivot 13 and a second leg 43 which locates between a pair of spaced apart spigots 44 moulded in body 10.

The body portions 10a and 10b making up body 10 are coupled and fastened together by mechanical fastenings 39 which extend through sleeves moulded in the body portions. In the case of pivot 13 the fastening 39 passes through sleeve 40a to strengthen the sleeve because of the loadings of the pivoting action of the lever 12. To assist the smooth operation of the pivot it is preferred that an intermediate sleeve 40b of a wear resistant self lubricating material (e.g. nylon or acetal) be located between the inner wall surface of sleeve 40a and the fastening 39.

The applicator tool of the present invention provides for a long stroke of the applicator needle (but without the need for a large recess across which the needle must pass) yet is compact and easy to use. The applicator when used with a tag of the type described in our New Zealand patent specification No. 207898 enables the tag to be readily and quickly applied in a one "shot" application. Because of the thin elongate needle, curved undersides of the ramps 52 defining slot 33 and the associated spaced apart pressure surfaces 34a, which even at the commencement of application are in engagement with or extremely close to the object in which the tag is to be installed, the tag is immediately upon application commencing, folded down and around the needle, both prior to and as it passes through the ear, to ensure only a small aperture is formed in the ear. This is of considerable advantage in ensuring a high retention factor for the tag in both the short and long term especially where the tag is being installed in an animal.

The self engagement of the tag with the applicator needle ensures that the applicator can be quickly and easily loaded.

As will be appreciated by those skilled in the art the applicator tool as herein described is open to modification within the scope of the invention. For example if required the applicator tool can be readily modified so that it actually punches or forms a definite opening in the object to be tagged just prior to inserting the tag but without affecting the one shot type application function. To achieve this modification the leading end 27a is formed to provide an annular cutting edge (not shown) with a passage leading therefrom to allow removed tissue or material to move away from the cutting edge. A punch platen (also not shown) in the form of a plate is located in sliding engagement with pressure surfaces 34a so as to block the entry into groove 36 at the commencement of movement of needle 26. This plate is coupled, through a lost motion linkage, to the inner end of pivot arm 22.

Accordingly in the first few degrees of closing of lever 12 the leading end 27a of needle 26 pushes against the object to be tagged which is fully supported by the solid plate. A punching action thus takes place and once this is completed the lost motion movement of the linkage is completed and the plate is drawn downwardly away from the opening in the groove 36 to thereby permit movement thereinto in accordance with the normal operation of the tool as hereindescribed.

A further modified form of the applicator tool is shown in FIG. 5. In the modified form wall 32a is replaced by an arcuate slot 55 in which runs a guide pin 56 (replacing roller 30) attached to a sear 57. The sear 57 is pivotally mounted to a projection 58 on pivot arm 22 and at its free end it engages in a rebate 59 in the extension 29 of needle 26. Sear 57 is spring biassed, however, when the guide pin 56 reaches the end of slot 55 (as shown) the sear 57 is held against the spring bias whilst the pivot arm 22 continues to move. This results in sear 57 becoming disengaged from rebate 59 thereby allowing needle 26 to pivot about pivot 25 and move out of the body in the same manner as shown in FIG. 3.

We claim:

1. An applicator tool comprising:
   a body;
   a lever pivotally mounted with the body;
   an applicator needle adapted at a leading end thereof to be engageble with a leading portion of a tag;
   means coupling said needle to said lever, such that pivotal movement of the lever is reflected in movement of the needle from a rest position toward a position where the leading end has been forced through a part of an object to be identified by the tag and carried with the leading portion of the tag, said needle being of overall curved shape and being located by guide means whereby the needle moves, during application of a tag, on an arcuate path, said body having a recess formed therein such that the portion of the object to which a tag is to be applied can be located within said recess; and tag location means positioned adjacent said leading edge of the needle when said needle is in the rest position, said tag location means causing a tag when located therein to engage with the leading end of said applicator needle, said tag location means being formed by a slot into which the leading portion of a tag can be inserted, said slot including a surface so positioned that pressure is applied to said leading portion of the tag thereby causing said leading portion to become engaged with the free end of said needle.

2. An applicator tool as claimed in claim 1 wherein the free end of the needle has a lug which is located adjacent said slot during the initial closing of the applicator.

3. An applicator tool as claimed in claim 1 or 2 wherein a longitudinally extending gap is formed in the outermost wall of said slot to permit movement therethrough of connecting portion of a tag as the needle is moved across said recess.

4. An applicator tool as claimed in claim 3 wherein the coupling means comprises a toothed quadrant pivotally mounted within the body and coupled to said lever by a link, the toothed quadrant meshing with a toothed surface of a pivot arm which is coupled to said needle, said guide means causing said needle to move on an arcuate path having a radius centred substantially on the pivot centre of said pivot arm.

5. An applicator tool as claimed in claim 4 wherein the guide means comprises a pair of spaced apart longitudinally curved surfaces between which said needle is located, the needle having an extension which extends beyond the pivot coupling of the needle to the pivot arm, this extension having roller means which is engageable with one or both of said surfaces, one said surface curving away from said other surface at a point where a tag will have been installed by said needle such as to allow the needle to be freely pivotable about its pivot coupling to the pivot arm, such as to be movable away from said recess.

6. An applicator tool as claimed in claim 4 wherein the guide means comprises an arcuate slot in which a guide pin can run said guide pin being mounted by a sear attached pivotally to said pivot arm, the free end of said sear being located in engagement in said needle, the sear being pivotable away from engagement with the needle when said guide pin reaches an end of the arcuate slot thereby permitting said needle to pivot about its pivot connection to said pivot arm such as to be movable away from said recess.

7. An applicator tool as claimed in claim 1 wherein said guide means is located within said body and an elongate recess is formed in said body, said elongate recess being aligned with an opening into said recess, said needle during closure of the applicator moving through said opening and into said elongate recess, said guide means permitting movement of needle away from said body and out of said recess and elongate recess when said applicator has been or approaches a fully closed position.

8. An applicator tool for an identification tag having a head portion which in use is forced by said applicator tool through a part of an object to be identified, said applicator tool comprising:
   a body;
   a lever pivotally mounted with the body;
   an elongate member;
   tag engagement means disposed at a leading end of said elongate member;
   means coupling said elongate member to said lever such that pivotal movement of the lever is reflected in movement of the elongate member from a rest position toward a position where the leading end has been forced through the part of the object to be identified and has carried with it the head portion of the tag; and
   tag location means positioned adjacent the leading end of the elongate member when in said rest position such that the head portion of the tag can be located therein and caused to become engaged with the tag engagement means such that during movement of the lever the head portion is engaged and carried by the elongate member.

9. An applicator tool as claimed in claim 8 wherein the tag location means is formed by a slot into which the head portion of a tag can be inserted, said slot including a surface so positioned that pressure is applied to said head portion of the tag thereby causing said head portion to become engaged with said tag engagement means.

10. An applicator tool as claimed in claim 8 or 9 wherein the tag engagement means is a lug which is located adjacent said slot such that during initial movement of the elongate member from the rest position the lug becomes engaged with the head portion of the tag.

11. An applicator tool as claimed in claim 8 or 9 wherein said slot includes a passage such as to permit movement therethrough of a connecting portion which connects the head portion of the tag to a panel as the elongate member is moved as a result of pivotal movement of the lever.

12. An applicator tool as claimed in claim 8 or 9 wherein the elongate member is a needle of overall curved shape and is located by guide means whereby the needle moves, during application of a tag, on an arcuate path, said guide means permitting movement of the needle away from said body when said applicator tool approaches a fully closed position.

* * * * *